(12) United States Patent
Barber

(10) Patent No.: US 6,330,921 B1
(45) Date of Patent: Dec. 18, 2001

(54) LAWN AERATING AND WEEDING TOOLS

(76) Inventor: Lyle C. Barber, 31549 Monte Vista Crescent, Abbotsford, British Columbia (CA), V2T 1Y8

( * ) Notice: Subject to any disclaimer, the term of this patent is extended or adjusted under 35 U.S.C. 154(b) by 0 days.

(21) Appl. No.: 09/694,825

(22) Filed: Oct. 24, 2000

(51) Int. Cl.[7] ............................................... A01B 45/00
(52) U.S. Cl. ........................... 172/22; D8/7; 172/371
(58) Field of Search ............................ 172/21, 22, 371, 172/376; 111/106; 294/50.6; D8/7; 16/110 R

(56) References Cited

U.S. PATENT DOCUMENTS

| | | | | |
|---|---|---|---|---|
| D. 235,504 | * | 6/1975 | Kramer ........................ | D8/7 |
| D. 251,698 | * | 5/1979 | Bartholomew, Jr. ............ | D8/5 |
| D. 253,390 | * | 11/1979 | Bartholomew ................. | D8/7 |
| D. 342,651 | * | 12/1993 | Manos ........................ | D8/1 |
| D. 371,493 | * | 7/1996 | Beaulieu ..................... | D8/7 |
| D. 411,944 | * | 7/1999 | Lanz ......................... | D8/7 |
| 826,452 | * | 8/1906 | Barry ........................ | 172/22 |
| 1,939,897 | * | 12/1933 | Hill ......................... | 55/18 |
| 2,210,440 | * | 8/1940 | Avary ........................ | 294/50.7 |
| 2,439,524 | * | 4/1948 | Moore ........................ | 97/63 |
| 3,011,563 | * | 12/1961 | Ceretti et al. ............... | 172/22 |
| 3,865,055 | * | 2/1975 | Gilbaugh ..................... | 111/4 |
| 4,556,114 | * | 12/1985 | Ryan ......................... | 175/20 |
| 4,848,484 | * | 7/1989 | Clements ..................... | 175/20 |
| 4,932,339 | * | 6/1990 | List ......................... | 111/106 |
| 4,966,238 | * | 10/1990 | Shields ...................... | 172/19 |
| 5,709,273 | * | 1/1998 | Roth ......................... | 172/22 |

* cited by examiner

Primary Examiner—Thomas B. Will
Assistant Examiner—Kristine Markovich

(57) ABSTRACT

A lawn aerating and weeding tool has an elongate metal attachment secured to one end of an elongate handle. The metal attachment comprises an annular cutting blade at one end of the metal attachment, a retainer at an opposite end of the metal attachment and a connection between the annular cutting blade and the retainer; the retainer being secured to the one end of the handle. The connection provides a gap between the annular cutting blade and the retainer in axial alignment with the annular cutting blade and the handle, the gap being open towards opposite sides of the metal attachment to facilitate removal of earth plugs cut by the annular cutting blade.

2 Claims, 3 Drawing Sheets

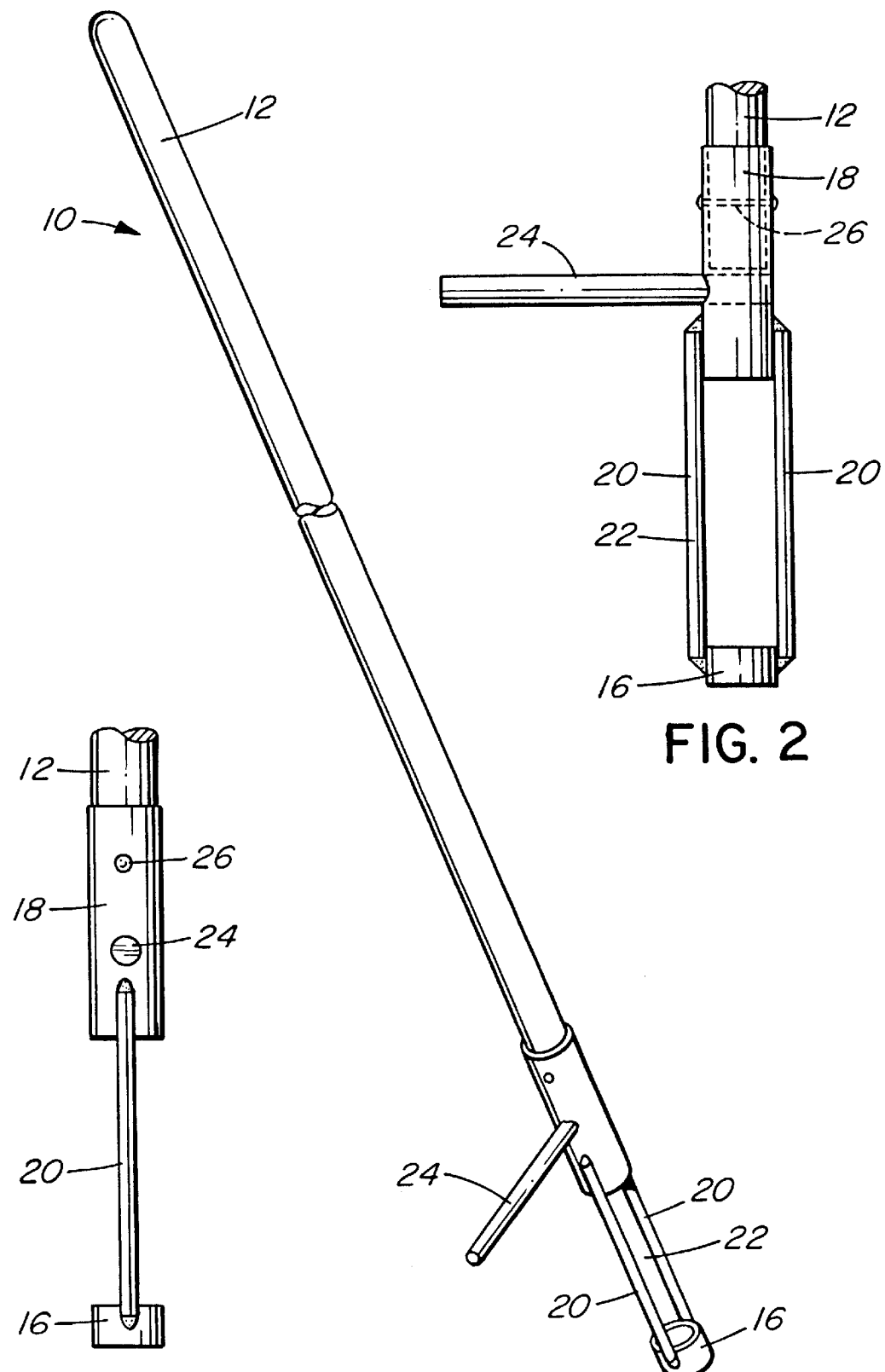

LAWN AERATING AND WEEDING TOOLS

BACKGROUND OF THE INVENTION

1. Field of the Invention

The present invention relates to lawn aerating and weeding tools and, more particularly, to tools of the type intended to be used for forming downwardly extending holes in lawns.

2. Description of the Related Art

As is well known to gardeners and others concerned with lawn care, the appearance and health of lawns can be maintained and, in some cases, substantially improved by forming a plurality of downwardly extending holes in the lawn for the purpose of draining and aerating the lawn.

It is also well known that lawns are often invaded by obnoxious weeds, which need to be removed. The removal of these weeds usually involves digging sufficiently deeply into the lawn to enable the roots of the weeds to be removed. If this digging is not effected very carefully, then the lawn may become unduly damaged.

BRIEF SUMMARY OF THE INVENTION

It is accordingly an object of the present invention to provide a novel and improved lawn aerating and weeding tool which facilitates the carefully controlled provision of holes in lawns and, if required, the removal of weeds from lawns.

According to the present invention, there is provided a lawn aerating and weeding tool which comprises an elongate handle and an elongate metal attachment secured to one end of the handle. The metal attachment comprises an annular cutting blade at one end of the metal attachment, a retainer at an opposite end of the metal attachment and a connection between the annular cutting blade and the retainer. The retainer is secured to the one end of the handle and the connection provides a gap between the annular cutting blade and the retainer, in axial alignment with the annular cutting blade and the handle. This gap is open towards opposite sides of the metal attachment to facilitate removal of plugs cut by the annular cutting blade.

In use of this tool, the handle is moved downwardly so as to drive the annular cutting blade downwardly into a lawn. This causes the annular blade to cut a plug of sod or grass and earth, which passes upwardly through the annular blade into the gap. The handle is then drawn upwardly to remove the annular blade and, therewith, the thus-cut plug from the lawn. The plug can then readily be removed through one or the other of the open sides of the metal attachment.

Preferably, the retainer is provided with a footrest, for example in the form of a laterally projecting metal rod, to facilitate driving of the annular cutting blade into the ground.

BRIEF DESCRIPTION OF THE DRAWINGS

The invention will be more readily understood from the following description of a preferred embodiment thereof given, by way of example, with reference to the accompanying drawings, in which:

FIG. 1 shows a view in perspective of a lawn aerating and weeding tool embodying the present invention;

FIGS. 2 and 3 show views in front and side elevation, respectively, of a metal attachment forming part of the tool of FIG. 1;

DESCRIPTION OF THE PREFERRED EMBODIMENT

Figure 4:
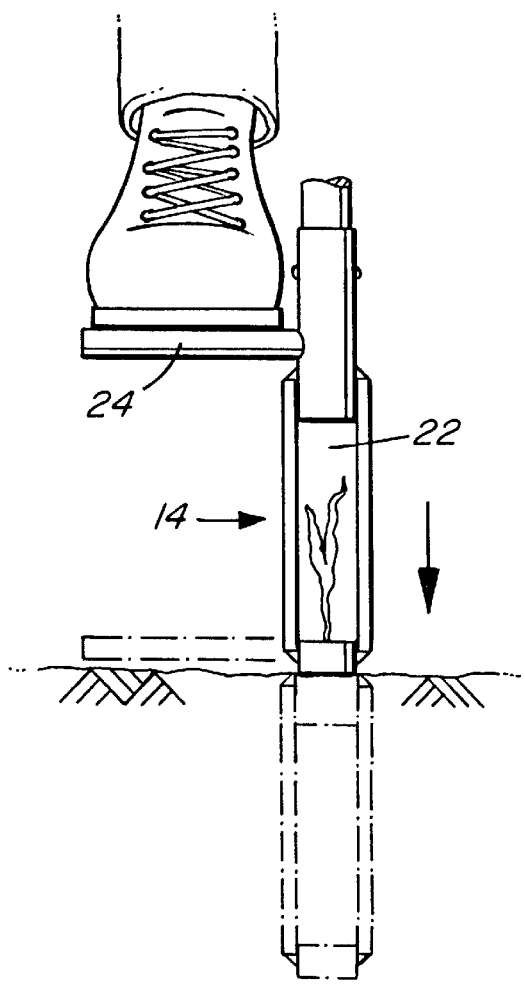
FIGS. 4 and 5 show two views in front elevation of the metal attachment in use in removing a plug of earth.

In the accompanying drawings there is shown a lawn aerating and weeding tool indicated generally by reference numeral 10, which comprises an elongate wooden handle 12, similar to a broomstick, provided at one end with a metal attachment indicated generally by reference numeral 14.

The metal attachment 14 comprises an annular cutting blade 16, which, as can be seen, is of cylindrical shape and which is formed from a ½ inch section of 1 inch diameter steel pipe, a retainer 18 in the form of a tube formed of a 3 inch section of 1 inch diameter steel pipe and fitted over the end of the handle 12 and a connection, in the form of two parallel rods 20 elongate connecting member in the for of ¼ inch diameter steel, between the annular cutting blade 16 and the retainer 18. The metal rods 20, which are welded to the cutting blade 16 and the retainer 18, define between the annular cutting blade 16 and the retainer 18 a gap or free space 22 which is located between the metal rods 20 and extends from the cutting blade 16 to the retainer and which is in axial alignment with the annular cutting blade 16, the retainer 18 and the handle 12. This gap 22 is laterally open between the rods 20 towards opposite sides of the metal attachment 14.

The metal attachment 14 also includes a footrest 24 in the form of a metal rod which extends through the retainer 18, at opposite sides of the retainer 18, and forms an abutment for the end of the handle 12.

A securing pin 26 in the form of a rivet also penetrates opposite sides of the retainer 18 and, in addition, extends through the end of the handle 12 so as to secure the retainer 18 to the handle 12.

When the lawn aerating and weeding tool 10 is in use, it is driven downwardly into the ground, as illustrated in FIG. 4, by pressure of a user's foot on the foot rest. The annular cutting blade 16 thereby cuts a plug of earth, and this plug may include a root of a weed.

Figure 5:
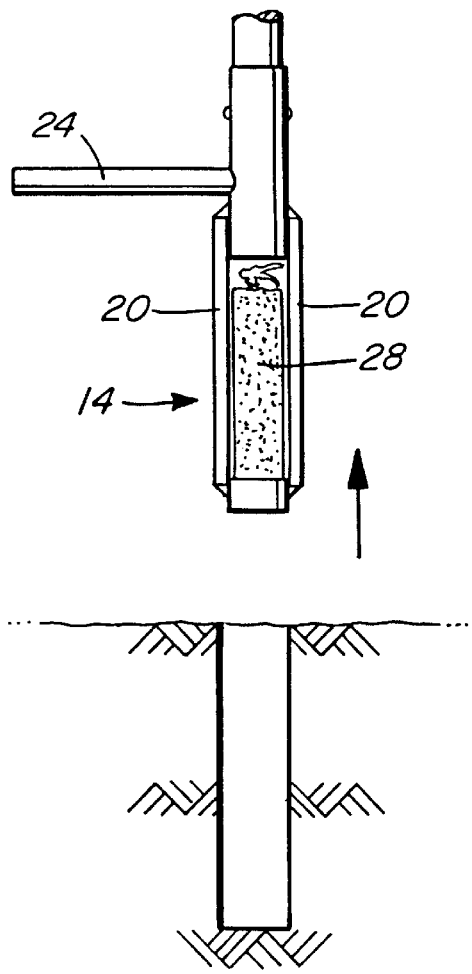

When the lawn aerating and weeding tool 10 is then subsequently withdrawn upwardly, as shown in FIG. 5, the earth plug is also withdrawn from the ground and is located in the gap 22 between the annular cutting blade 16 and the retainer 18, between the two metal rods 20.

Figure 6:
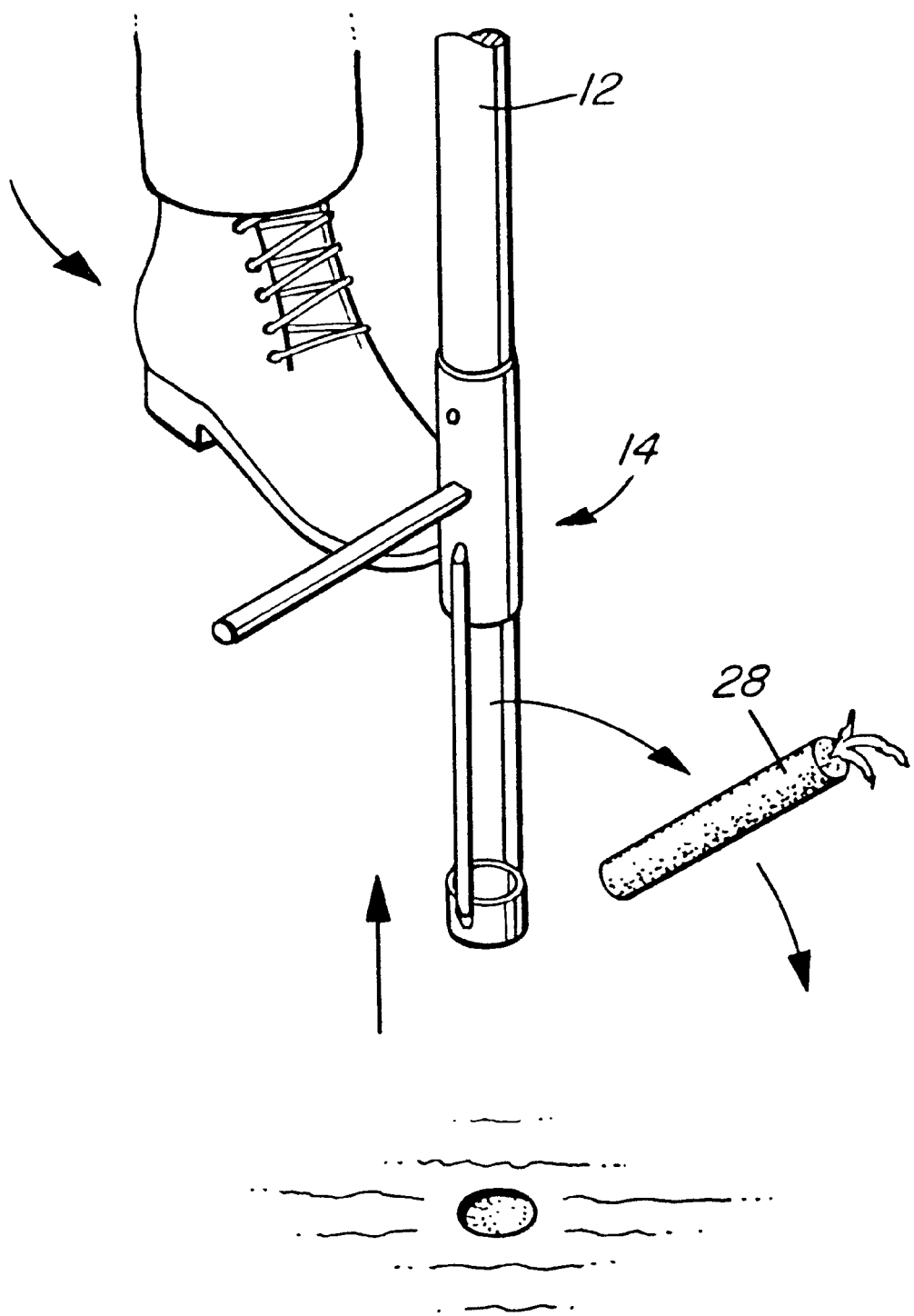
FIG. 6 shows a view in perspective of the metal attachment during removal of the earth plug.

This plug can then easily be removed laterally through one or the other of the open sides of this gap 22 by kicking against the retainer 18, as shown in FIG. 6.

As will be apparent to those skilled in the art, various modifications may be made in the above-described embodiment of the present invention within the scope of the appended claims.

I claim:

1. A lawn aerating and weeding tool, comprising
   an elongate handle;
   an elongate metal attachment secured to one end of said handle;
   said metal attachment comprising an annular cutting blade at one end of said metal attachment, a retainer at an opposite end of said metal attachment and a connection between said annular cutting blade and said retainer;
   said retainer being secured to said one end of said handle;
   said connection comprising a pair of parallel elongate connecting members providing a free space extending from said annular cutting blade to said retainer in axial alignment with said annular cutting blade and said handle for accommodating within said free space earth plugs cut by said annular cutting blade;

said free space being open between said pair of connecting members towards opposite sides of said metal attachment along the length of the free space to facilitate removal of the earth plugs; and a footrest projecting laterally from said retainer, said retainer comprising a metal tube receiving said one end of said handle, and said footrest comprising a metal rod extending through said retainer and forming an abutment for said one end of said handle.

2. A lawn aerating and weeding tool as claimed in claim 1, wherein said connecting members comprise a pair of metal rods connected at opposite ends thereof to said annular blade and said retainer.

* * * * *